(12) United States Patent
Szarmes (10) Patent No.: US 7,532,649 B1
(45) Date of Patent: May 12, 2009

(54) OPTICAL CAVITY FOR COHERENT SUPERPOSITION OF OPTICAL PULSES

(75) Inventor: Eric Szarmes, Honolulu, HI (US)

(73) Assignee: University of Hawaii, Honolulu, HI (US)

( * ) Notice: Subject to any disclaimer, the term of this patent is extended or adjusted under 35 U.S.C. 154(b) by 608 days.

(21) Appl. No.: 11/143,106

(22) Filed: Jun. 2, 2005

(51) Int. Cl.
*H01S 3/10* (2006.01)
*H01S 3/13* (2006.01)
*H01S 3/08* (2006.01)

(52) U.S. Cl. .................. 372/9; 372/29.022; 372/92
(58) Field of Classification Search ............ 372/14, 372/15, 29.022, 92, 99, 9, 30, 98, 101, 2; 378/119
See application file for complete search history.

(56) References Cited

U.S. PATENT DOCUMENTS

| | | | |
|---|---|---|---|
| 4,598,415 A | 7/1986 | Luccio et al. |
| 5,247,562 A | 9/1993 | Steinbach |
| 5,353,291 A | 10/1994 | Sprangle et al. |
| 5,495,515 A | 2/1996 | Imasaki |
| 5,701,317 A | 12/1997 | Yu et al. |
| 5,825,847 A | 10/1998 | Ruth et al. |
| 6,035,015 A | 3/2000 | Ruth et al. |
| 6,724,782 B2 | 4/2004 | Hartemann et al. |
| 7,382,861 B2 | 6/2008 | Madey et al. |

OTHER PUBLICATIONS

Hiroshi Sakai et al., "Measurement of an electron beam size with a laser wire beam profile monitor," Physical Review Special Topics—Accelerators and Beams, vol. 4, 022801 (2001), pp. 1-6.

R. Jason Jones et al., "Stabilization of Femtosecond Lasers for Optical Frequency Metrology and Direct Optical to Radio Frequency Synthesis," Physical Review Letters, vol. 86, No. 15, Apr. 9, 2001, pp. 3288-3291.

Andre N. Luiten et al., "Ultrafast resonant polarization interferometry: Towards the first direct detection of vacuum polarization," Physical Review A 70, 033801 (2004), pp. 1-9.

Anthony E. Siegman, "Lasers," cover page, acknowledgement page, contents page, pp. 750-759, Total pages 13, 1986.

(Continued)

*Primary Examiner*—Armando Rodriguez
(74) *Attorney, Agent, or Firm*—Knobbe, Martens, Olson & Bear, LLP (57) ABSTRACT

An apparatus is described that includes an optical storage cavity comprising a planar mirror and a spherically curved mirror that form an optical path therebetween. A pump laser introduces optical pulses into the cavity. A folding mirror is disposed in the optical path between the planar mirror and the spherically curved mirror such that a beam waist is formed between the folding mirror and the second spherically curved mirror. The optical pulses preferably interact with selected particles disposed in the optical path at the waist. The apparatus further comprises a first transducer which adjusts the distance between the spherical mirror and the folding mirror to change a characteristic of the beam waist. A second transducer adjusts the distance between the planar mirror and the spherical mirror to change the optical path length of the cavity. The optical cavity is arranged such that the change in path length due to the second transducer does not significantly affect the characteristic of the beam waist.

25 Claims, 5 Drawing Sheets

OTHER PUBLICATIONS

Crosbie et al., "Improvement of the Dynamic Aperture in Chasman Green Lattice Design Light Source Storage Rings," IEEE, proceedings of PAC 1987, pp. 443-445 (1987).

Fukasawa et al., "Compact Hard X-Ray Source Via Inverse Compton Scattering Based on the X-Band Linac," Proceedings of the Second Asian Particle Accelerator Conference, Beijing, China, 2001, pp. 843-845.

Doucet et al., eds., "Industrial and Commercial Unit, A Light for Industry," brochure of European Synchrotron Radiation Facility, pp. 1-30 (2002).

Korchuganov et al., "The Nanohana 2 GeV Synchrotron light source," Nuc. Instruments and Methods in Physics Res., 448:27-31 (2000).

LaClare, I. L., "Light Source Performance Achievements," pp. 78-82. Undated.

Nghiem et al., "Optics for Solei I at 2.5 GEV," IEEE, pp. 1406-1408 (1998).

Webber et al., "Post Mortem of the Electronic Publication of the PAC2001 Proceedings," pp. 1-20 (2001).

LaClare, J. L., "Light Source Performance Achievements,"Nuclear Instruments and Methods in Physics Research A 467-648 2001, pp. 1-7.

"Joint Accelerator Conference Website, A service for the whole accelerator community," poster, http://www.JACoW.org/.

Nomura et al. "Enhancement of Laser Power From A Mode Lock Laser With An Optical Cavity," pp. 2637-2639, EPAC 2004, Lucerne, Switzerland.

OPTICAL CAVITY FOR COHERENT SUPERPOSITION OF OPTICAL PULSES

BACKGROUND

1. Field of the Invention

The present invention relates to optical cavities that provide coherent superposition of optical pulses and that focus the optical pulses into a localized interaction region. Such optical cavities may be used, for example, to produce x-ray and gamma-ray emission from Compton backscattering of optical photons from high energy electrons.

2. Description of the Related Art

In many technological areas there is a need for a system for accumulating optical energy by coherently superimposing laser pulses in order to generate high intensity optical pulses that are focused onto a localized interaction region.

For example, various research endeavors in fields such as atomic and molecular physics, x-ray crystallography, proteomics and genomics, nuclear spectroscopy, and astrophysics require the production of x-ray or gamma-ray beams having high photon fluences. One method of generating such x-rays and gamma-rays is to direct high energy electrons into a region illuminated by optical photons. Energy from the electrons is imparted onto the photons via Compton backscattering, thereby producing higher energy photons such as x-rays and gamma-rays. The intensity of the x-ray and gamma-ray output is directly dependent on the quantity of photons that interact with the electrons. Accordingly, to achieve the desired high photon fluences of x-rays and gamma-rays, high intensity optical pulses with correspondingly large photon counts are preferably interacted with the high energy electrons. To produce such high intensity optical pulses, a pump laser is arranged to emit laser pulses into an optical cavity having a cavity length suitable for providing coherent superposition of the laser pulses. The intensity of the optical pulses within the cavity depends in part on the number of laser pulses that are coherently stacked. The intensity of the optical pulses is further enhanced by focusing the optical output into a small localized region where the optical pulses interact with the electrons.

The study of laser-matter interactions may also benefit from optical systems configured to focus high intensity optical pulses into a small localized region. Interesting interactions between atoms, molecules, and other matter can occur in a localized region having high electromagnetic field strength. To introduce large amounts of the optical energy into the interaction region thereby producing enhanced strength electromagnetic fields, it is advantageous to have the capability to focus and precisely aim high intensity optical pulses.

What is needed therefore is an optical storage cavity in which optical energy within the cavity can be accumulated by coherently stacking laser pulses emitted from a pump laser. It is further desirable to configure the optical cavity to produce a narrow focal spot at a localized interaction region, e.g., within the cavity. The system preferably also should minimize the loss of optical energy from the cavity in order to achieve high efficiency.

SUMMARY

One embodiment of the invention comprises an apparatus comprising an optical cavity and a source of optical pulses. The optical cavity comprises first and second mirrors. The cavity provides an optical path between these mirrors. The source of optical pulses is coupled to introduce optical energy into the cavity along the optical path. The apparatus further comprises an optical element disposed in the optical path such that a beam waist of the optical energy is disposed between the optical element and the second mirror, and such that the pulses interact with selected particles disposed in the optical path at the waist. Additionally, the apparatus comprises first and second transducers. The first transducer adjusts the distance between the second mirror and the optical element to change a characteristic of the waist. This change in the waist changes the length of the optical path. The second transducer adjusts the distance between the first mirror and the second mirror to change the optical path length. The optical cavity is arranged such that the change in path length due to the second transducer does not significantly affect the characteristic of the waist. The first mirror may be substantially planar.

Another embodiment of the invention comprises a method comprising interacting an optical beam with particles disposed in an optical cavity at substantially a waist of the optical beam, altering a characteristic of the beam waist by changing the length of the cavity, and altering the length of the optical cavity without significantly affecting the waist of the beam.

Another embodiment of the invention comprises an apparatus comprising a storage cavity and a source of electromagnetic pulses. The storage cavity comprises first and second reflective elements. The cavity provides a beam path between the first and second reflective elements. The source of electromagnetic pulses is coupled to introduce electromagnetic energy into the cavity along the beam path. The apparatus first comprises a third optical element disposed in the beam path such that a beam waist of the electromagnetic energy is disposed between the second reflective element and the third optical element, and such that the pulses interact with selected particles disposed in the beam path at the waist. Additionally, the apparatus comprises first and second transducers. The first transducer adjusts the distance between the second reflective element and the third optical element to change a characteristic of the waist. The change in the waist changes the length of the beam path. A second transducer adjusts the distance between the first reflective element and the second reflective element to change the beam path length. The storage cavity is arranged such that the change in path length due to the second transducer does not significantly affect the characteristic of the waist. The first reflective element may be substantially planar.

Another embodiment a method comprising interacting an electromagnetic beam with particles disposed in a storage cavity at substantially a waist of said electromagnetic beam, the storage cavity having an optical path length, altering a characteristic of the beam waist by changing the optical path length of the cavity, and altering the optical path length of the storage cavity without significantly affecting the waist of the beam.

DETAILED DESCRIPTION OF THE PREFERRED EMBODIMENT

Various embodiments of the present invention comprise a system and apparatus for interacting high intensity optical pulses with particles at a localized interaction region. According to one aspect of the invention, for example, the apparatus comprises an optical cavity that is suitable for coherently superimposing laser pulses injected into the optical cavity by a pump laser. Enhanced strength optical pulses result. Preferably, the optical cavity comprises optical elements whose shapes, orientations, and positions concentrate the optical pulses onto a localized region where the optical pulses can interact with particles, such as, for example, electron propagating in an electron beam. The system can be advantageously used in various fields of endeavor such as, for example, x-ray crystallography, proteiomics and genomics, nuclear spectroscopy, astrophysics, vacuum quantum electrodynamics (QED), and laser-matter interactions, etc. A discussion of vacuum QED is presented, e.g., in A. N. Luiten and J. C. Petersen, "Ultrafast resonant polarization interferometry: Towards the first direct detection of vacuum polarization," Phys. Rev. A, vol. 70, 033801, 2004, which is incorporated herein by reference in its entirety.

Figure 1:
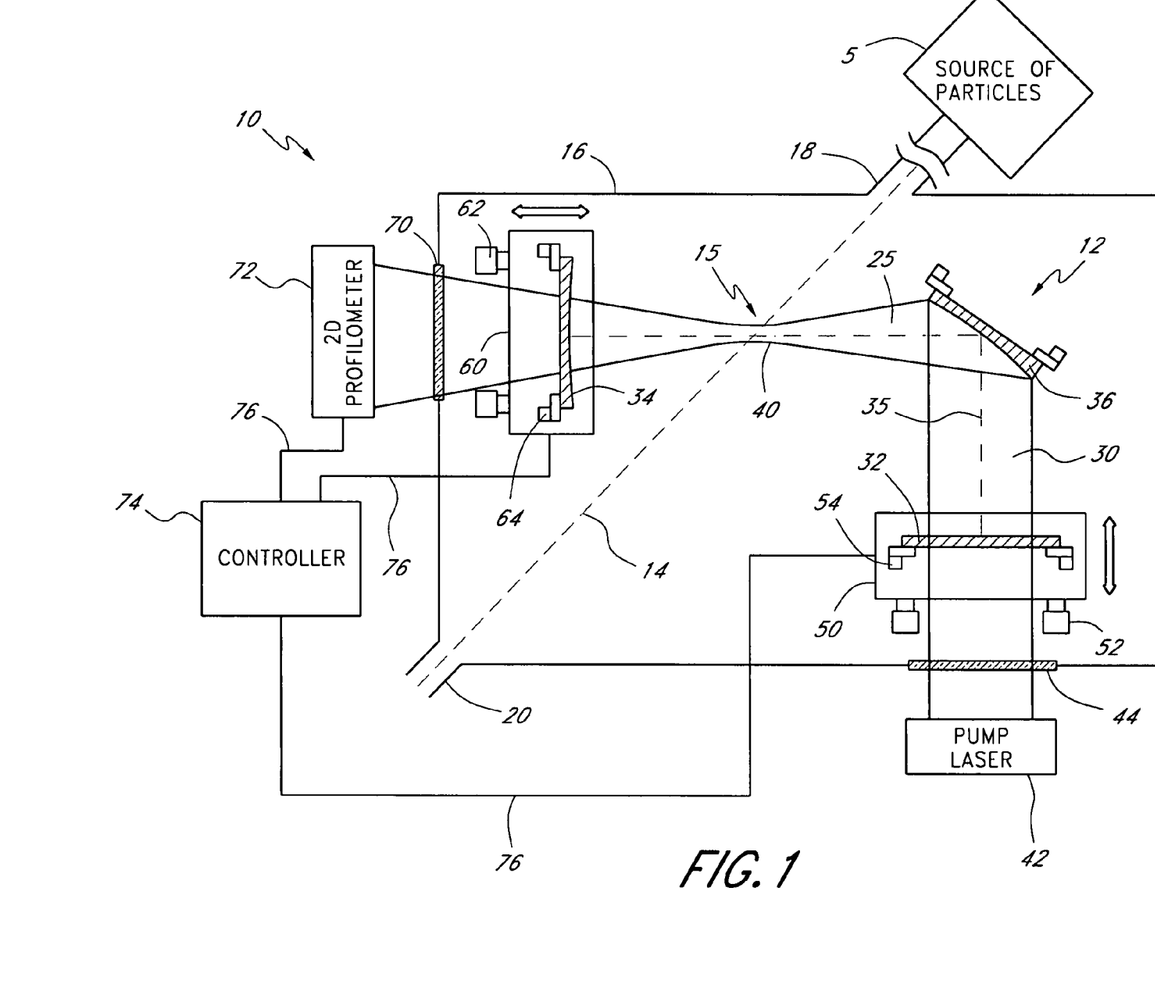
FIG. 1 is a schematic view of an embodiment of an optical storage cavity comprising a spherical mirror, an off-axis paraboloidal mirror, and a plane mirror wherein an optical path is defined between the plane mirror and the spherical mirror.

FIG. 1 is a schematic view of an embodiment of a system 10 for interacting high intensity optical pulses with particles, such as electrons. The system 10 comprises an optical cavity 12 that supports an optical beam 25 and a source of particles 5 that produces a particle beam 14 such as an electron beam. Alternately, the source of particles may, for example, be an atomic source which delivers particles randomly into the interaction region via the gas phase. In this sense the term 'beam' is used generally. The optical cavity 12 and the source of particles 14 are situated and configured to provide an interaction region 15 wherein the optical beam and the particle beam 14 intersect.

The electron beam 14 can be generated in a linear accelerator or a storage ring, such as a betatron. The electron beam 14 can be directed into the optical cavity 12 by an electron beam guidance system (not shown) that may comprise bending magnets that control the trajectory of the electron beam 14 and beam conditioners (e.g., magnetic lenses) that control the steering, focusing and dispersion of the electron beam 14. A wide variety of designs and configurations are possible for providing and controlling the electron beam 14. In other embodiments, other types of particles may be interacted with the optical beam 25 and similarly other configurations may be employed to provide particles in the interaction region 15.

As shown in FIG. 1, the system 12 further comprises a housing or chamber 16 such as a vacuum chamber that includes an inlet port 18 configured to allow for the injection of particles, such as the electron beam 14. An outlet port 20 is arranged to allow the electron beam 14 to exit the chamber 16. The ports 18 and 20 are small apertures in the vacuum chamber 16, and each may comprise a duct and flange designed to connect the vacuum chamber 16 to, for example, the electron beam guidance system. Optionally, an operator of the system 10 can take diagnostic measurements of conditions within the vacuum chamber 16 by inserting probes or by observing radiation through the ports 18 and 20. Additional ports may also be included. After exiting the outlet port 20, the electrons may continue back into a storage ring guided by the electron beam guidance system. In various embodiments, the electrons are recycled and boosted in energy in preparation for making another passage through the system 10. Alternatively, the exiting electron beam 14 may be directed into a beam dump for disposal. Other configurations are possible. For example, other types of housing or chambers 16 may be used.

In the embodiment shown in FIG. 1, the optical cavity 12 (referred to interchangeably as the optical storage cavity) for accumulating optical energy comprises a first end reflective element 32 and a second end reflective element 34 that together define an optical path 30 extending therebetween. The optical beam 25 propagates along this optical path 30. Certain characteristics of this optical beam 25 are controlled by the optical cavity 12 and the first and second reflective elements 32, 34. The reflective elements 32 and 34 are preferably mirrors. An optical element 36 such as a folding mirror disposed in the optical path between the end mirrors 32 and 34 causes the optical path 30 to fold so that a first section of the optical path 30 between the first end mirror 32 and the folding mirror 36 makes an angle with respect to a second section of the optical path 30 between the second end mirror 34 and the folding mirror 36. Among other advantages, the use of a folded optical path 30 may make the optical cavity 12 more compact in size, may improve packaging, and may provide a more preferable orientation between the optical path 30 and the electron beam 14. In the embodiment illustrated in FIG. 1, the folding mirror 36 is an asymmetrically shaped curved mirror and the angle between the first and second sections of the optical path 30 is about ninety degrees although other orientations are possible.

An optical axis 35 is shown extending through the first and second end mirrors 32, 34 and the folding mirror 36. This optical axis 35 also bends ninety degrees.

The optical cavity 12 preferably supports a Gaussian beam in which the intensity distribution across a cross-section perpendicular to the optical path 30 or the optical axis 35 is substantially a Gaussian function as is well known in the art. When viewed along the axis of propagation, the shape of the optical beam 25 in certain embodiments can be characterized as having a substantially circular cross-section. Other embodiments may employ mirrors and optics whose shape and/or curvature possess elliptical, cylindrical, or rectangular symmetry instead of circular symmetry, so that, for example, the stored optical beam may have different dimensions (e.g., radii) in the horizontal and vertical directions. As referred to herein, the transverse radius of the optical beam 25 corresponds to the transverse distance between optical axis 35 where the intensity is maximum and the point where the intensity of the optical energy decreases by a factor of $1/e^2$ from its maximum value.

Preferably, the first and second end mirrors 32, 34 and the optical element(s) 36 therebetween have shapes and locations so as to provide for stable oscillation of light in the optical cavity 12. In particular, the size, curvature and location of the second end mirror 34 as well as that of the folding mirror 36 between the first and second end mirrors 32, 34 are preferably such that the storage cavity 12 is not diffractively lossy. Preferably the curvature of the elements 32, 34, 36, which controls the divergence and convergence of the beam 25 together with the location and size of the elements are such that light is contained within the optical cavity 12 and is not lost beyond the perimeter of the optical elements such as through excess divergence or diffraction or otherwise. In various preferred embodiments, the second end mirror 34 is substantially spherical in shape. Other shapes, however, are possible. Additionally, other configurations including lossy designs may be employed. For example, in certain preferred embodiments, one or more of the first and second end mirrors 32, 34 and the folding mirror 36 therebetween has a reduced clear aperture so as to reduce the cross-section of the optical beam. Similarly, an aperture may be introduced into the optical cavity 12. Lossy elements may also assist in controlling optical intensity that builds up in the optical cavity 12 and may aid in reducing or avoiding optical damage or may otherwise be useful in certain applications. Still other configurations are possible.

A pump laser source 42 is positioned to emit laser pulses through a window 44 in the chamber 16 and through the first end mirror 32, which is preferably at least partially transmissive. Accordingly, the window 44 preferably is substantially disposed in the optical path from the pump laser 42 to the first end mirror 32. Optical energy can thereby be introduced into the optical cavity 12 along this optical path 25. The pump laser 42 may comprise a wide variety of pulsed laser sources including but not limited to a tunable mode-locked dye laser, a mode-locked Nd:YAG laser, an excimer laser, a diode laser, a nitrogen laser, or a phase-locked free-electron laser. The pump laser 42 has a pulse repetition rate corresponding to the rate at which the pulses are emitted from the pump. Preferably the window 44 comprises material that is transmissive to the wavelength of the laser pulses that are emitted from the pump laser 42 and injected into the cavity 12. In some embodiments, for example, the window 44 comprises glass or fused silica.

As referred to above, the first end mirror 32 is also preferably partially transmissive of the optical energy emitted by the pump laser 42 and propagating in the cavity 12. This first mirror 32, for example, may be between about 99.99 to 99% reflective and 0.01 to 1% transmissive at the wavelength of operation, depending on the desired intensity to be achieved at the focus and the given pulse structure of the optical beam. Other values outside this range, however, are possible. In some embodiments, the second end mirror 34 and the folding mirror 36 between the first and second end mirrors 32, 34 are substantially reflective, e.g., having losses substantially smaller than the transmittance of end mirror 32, to reflect the optical energy in the optical beam 25. The second end mirror 34 may transmit about $10^{-3}$ watts when $10^{10}$ watts are in the cavity 12. Additional attenuation may also be used to further reduce the amount of light output from the second end mirror 34. Other values compatible with the operation of the cavity, however, are possible.

Preferably, these elements 32, 34, 36, 44 do not introduce absorption at the operating wavelength. Preferably, components that attenuate the optical pulses are substantially removed from the optical path 30 of the beam 25. For example, the optical elements such as the window 44 and the first end mirror 32 may comprise material that is substantially non-absorbing at the wavelength of operation of the storage cavity 12. The optical path 30 is also preferably devoid of other elements that may absorb light at the operating wavelength. Accordingly, laser or gain mediums such as for amplification are preferably excluded from the optical path 30. The vacuum chamber 16 is also preferably evacuated by a vacuum pump, and thus, the chamber may contain reduced amounts of matter that could otherwise absorb appreciable optical energy from the laser pulses. Likewise, the optical path 30 is preferably substantially non-absorbing, except possibly in applications involving atoms or molecules in the gas phase. Also, as described above, the first and second end mirrors 32, 34, the folding mirror 36 as well as the window 44 preferably have a clear aperture at least as large as the optical beam 25 supported by the optical cavity 12 so as to reduce loss.

In the first section of the optical cavity 12 between the first end mirror 32 and the folding mirror 36, it is preferably desired that the optical beam 25 be substantially collimated. Accordingly, the first end mirror 32 is preferably substantially planar in shape such that planar wavefront propagation is supported in the first section of the optical cavity 12 although other shapes are possible. Additionally, the folding mirror 36 preferably has a shape and is disposed at a location such that wavefronts propagating in the first section of the optical cavity 12 are substantially planar although wavefronts propagating in the second section between the folding mirror 36 and the second end mirror 34 are curved. In the embodiment shown in FIG. 1, the folding mirror 36 preferably comprises a mirror with the shape of an off-axis paraboloid as described in more detail below (see FIG. 3).

In the second section of the optical cavity 12 between the second end mirror 34 and the folding mirror 36, preferably the optical beam 25 has a beam waist 40 and this beam waist preferably coincides with the interaction region 15. The transverse radius of the optical beam 25 at the beam waist 40 is smaller than, and preferably much smaller than, the transverse radius of the optical beam 25 elsewhere in the optical cavity 12 such as, for example, near the first end mirror 32. Characteristics of the beam waist 40, such as its position and transverse radius, depend primarily on the curvatures of and the distance between the second end mirror 34 and the folding mirror 36. Preferably, the second end mirror 34 and the folding mirror 36 have curvatures, locations, and orientations such that the beam waist 40 is located in the interaction region 15 or in close proximity thereto.

The shapes and location of the mirrors 32, 34, 36, however, should not be limited to those specifically described herein. Alternative mirror designs can be selected so that the optical cavity 12 can store high intensity optical pulses with increased intensity in the localized interaction region 15. Other embodiments of the system 10 may utilize mirrors that are substantially planar, convex, or concave. Additionally, different numbers and placements of mirrors may be used to fold the optical path 25 into a different orientation than shown in FIG. 1.

The system 10 shown in FIG. 1, can preferentially interact high intensity optical pulses with particles in the localized interaction region 15. Because the fluence of optical energy within the optical beam 25 is substantially increased or is a maximum at the position of the beam waist 40, it is preferable that the localized interaction region 15 be at the beam waist. Such an arrangement advantageously exposes the particles to high intensity optical pulses with large photon counts and large electromagnetic field strengths.

As described above, the electron beam guidance system may use bending magnets to control the trajectory of the electron beam 14 so that the electron beam enters the optical cavity 12 through the inlet port 18, travels through the localized interaction region 15 preferably at the beam waist 40, and then exits the optical cavity 12 through the outlet port 20. Beam conditioners may be used to adjust the dispersion and transverse radius of the electron beam 14. In various preferred embodiments, the transverse radius of the electron beam 14 in the localized interaction region is reduced to enhance the efficiency of the interaction between the electrons and the high intensity optical pulses.

The interaction of the electrons in the electron beam 14 with photons in the optical beam 25 is possible, resulting in Compton backscattering. In Compton backscattering energy from the electrons to the optical photons thereby generating higher energy x-rays and gamma-rays, which may exit the optical cavity 12 through the outlet port 20. Preferably, a portion of the outlet port 20 comprises a window through which the x-ray and gamma-ray beam passes. As described above, the x-ray and gamma-ray output can be used advantageously in endeavors such as x-ray crystallography, proteiomics and genomics, nuclear spectroscopy, and astrophysics. The system 10 can also be used to study the interaction of high intensity optical pulses with beams of other types of subatomic particles, such as, for example, positrons, protons, antiprotons, or neutrons.

Additionally, the system 10 may be used in the field of laser-matter interactions in which the effects of high strength electromagnetic fields on particles are studied. The particles are preferably atoms and molecules, but the system 10 is not limited to these particles. The matter may take the form, for example, of gas, or plasma, or possibly a small solid sample or small self-contained liquid sample situated at the interaction region. A solid or liquid could be contained in a small transmissive container. The cavity parameters may be changed to account for the optical properties of the samples such as refractive index and/or absorption as well as to address potential optical damage that may result. Since the electromagnetic field strength is to be largest at the position of the beam waist 40, the atoms and molecules preferably are disposed at this position. Characteristics of the interaction between the particles and the high intensity optical pulses may be observed in some embodiments, for example, through the outlet port 20.

In various preferred embodiments, the optical cavity 12 is adjustable so as to tune the cavity to provide coherent superposition of the optical pulses. As shown in FIG. 1, for example, the first end mirror 32 is mounted on a first movable stage 50 that provides for adjustment of the length of the optical path 30. The adjustment of the first movable stage 50 is accomplished by one or more actuators 52 for translating the movable stage forwards and backwards along the direction of the optical path 25. In the embodiment depicted in FIG. 1, two transducers 52 are shown for exemplary purposes, although a different number or arrangement of actuators may be used. The actuators 52 may comprise power driven transducers such as piezoelectric devices or motors. The end mirror 32 is supported on the first movable stage 50 by one or more supports. The support preferably include positioning devices 54 for setting or adjusting the position and orientation (e.g., tip or tilt) of the end mirror 32 relative to the first movable stage 50. Such adjustments may be accomplished, for example, by using one or more screws, bolts, or micrometers, etc., either with or without bias such as spring bias, and may be made via transducers including for example piezoelectric devices or motors. Other types of positioning devices and other schemes for establishing the position and orientation of the first end mirror 32 may be used. For example, in the embodiment depicted in FIG. 1, two positioning devices 54 are shown for exemplary purposes, although the end mirror 32 could be attached to the first movable stage 50 using a different number or arrangement of positioning devices 54. Similarly, the support shown is only exemplary and the end mirror 32 could be attached to the first movable stage 50 using a different arrangement. Additionally, other types of movable stages 50 and other types of actuator devices 52 may be employed.

Additionally, in various preferred embodiments, the position of the beam waist 40 may also be varied by adjusting the optical cavity 12. As shown in FIG. 1, for example, the second end mirror 34 is mounted to a second movable stage 60 that provides for adjustment of the distance between the second end mirror 34 and the folding mirror 36. The second movable stage 60 preferably can be translated independently of the first movable stage 50. The adjustment of the second movable stage 60 may also be accomplished by one or more actuators 62 for translating the movable stage forwards and backwards along the direction of the optical path 25. In the embodiment depicted in FIG. 1, two transducers 62 are shown for exemplary purposes, although a different number or arrangement of actuators may be used. The actuators 62 may also comprise power driven transducers such as piezoelectric devices or motors. The second end mirror 34 is shown supported on the second movable stage 60 by supports. The support or supports preferably include positioning devices 64 for setting or adjusting the position and orientation (e.g., tip or tilt) of the end mirror 34 relative to the second movable stage 60. Such adjustments may be accomplished, for example, by using one or more screws, bolts, or micrometers, etc., either with or without bias such as spring bias, and may be made via transducers including for example piezoelectric devices or motors. Other types of positioning devices and other schemes for establishing the position and orientation of the first end mirror 34 may be used. For example, in the embodiment depicted in FIG. 1, two positioning devices 64 are shown for exemplary purposes, although the end mirror 34 could be attached to the second movable stage 60 using a different number or arrangement of positioning devices 64. Similarly, the support shown is only exemplary and the end mirror 34 could be attached to the second movable stage 60 using a different arrangement. Additionally, other types of movable stages 60 and other types of actuator devices 62 may be employed.

In various preferred embodiments, the second end mirror 34 is partially transmissive of the optical energy in the optical beam 25, and a fraction of the optical energy exits the optical cavity 12 through the second end mirror 34. The system 10 further comprises a window 70 in the vacuum chamber 16 disposed with respect to the optical cavity 12 and the second end mirror 34 so as to receive the light passing through the second end mirror. The window 70 is transmissive to the optical beam 25 and can be made from material such as, for example, glass or fused silica. Other types of windows, however may be employed. Additionally, other configurations are possible. For example, one or more mirrors or other optical elements may be employed to redirect the beam from the second end mirror 34 through the window 70.

As illustrated in FIG. 1, the system 10 may further comprise an optical sensor such as a 2-D profilometer 72 for monitoring the optical beam 25 propagating in the optical cavity 12. The 2-D profilometer 72 is preferably disposed with respect to the window 70 to receive light from the optical beam 25. As described above, however, optical elements (e.g., mirrors, coherent fiber bundles, etc.) may be employed to alter the path of the beam 25 to direct light to the 2-D profilometer 72. The profilometer 72 preferably comprises an optical detector array such as a CCD or CMOS detector array that measures the intensity profile of the optical beam 25. Other devices and configurations, however, may be employed. Examples include scanning type devices. The 2-D profilometer 72 preferably monitors the optical energy exiting from the optical cavity 12 to determine various characteristics of the optical beam 25 that may include the position, size, transverse profile, and intensity of the beam 25 and of the beam waist 40. For example, the 2-D profilometer 72 may determine the location of the optical beam 25 and in particular the location of the beam waist 40 with respect to the electron beam 14 in the desired interaction region 15. The profilometer 72 may also provide a measure of the beam diameter and an indication of the size of the beam waist 40. The profilometer 72 may in addition assist in quantifying the optical power or intensity of the beam 25, e.g., at the beam waist 15. In general, the beam waist can be located quite precisely from preliminary measurements and characterization of the resonator mirrors and the separation therebetween. The injected optical pulses can be focused to this region quite accurately. To better ensure that the injected pulses are overlapped with the circulating pulses in the waist region, the procedure would be to adjust or tweak the steering and timing of the injected pulses until increased or maximum power is observed in the intracavity Gaussian mode, as indicated, e.g., by the profilometer. The electron beam can similarly be directed to the waist region quite accurately by using a beam position monitoring device. However, the steering or timing may additionally be adjusted until increase or maximum x-ray flux is observed. The profiometer is generally broadband, however, can be designed or chosen to monitor the specific wavelength of the optical pulses.

In various preferred embodiments the profilometer 72 is in communication with a controller 74, for example, via a data line 76 such as shown in FIG. 1. Wireless, optical, or other types of communication links may be employed in certain embodiments. The profilometer 72 preferably transmits data characterizing the optical beam 25 to the controller 74 via this link 76. The controller 74 preferably comprises a microprocessor or computer that is programmed to analyze the data from the profilometer 72. In various preferred embodiments, the controller 74 includes processing components for processing the signals acquired by the detector array 72 and for possibly determining the desired parameters for characterizing the optical beam 25.

The controller 74 may also generate signals for driving the transducers 52, 54, 62, 64 in the translation stages 50, 60. Likewise, the controller 74 is preferably in communication with and controls the positioning stages 50, 60. In FIG. 1, control lines 76 connect the controller 74 and the positioning stages 50, 60, although wireless, optical, or other types of communication links may also be employed in various embodiments. In certain preferred embodiments, in response to the data acquired by the 2-D profilometer 72, the controller 74 outputs one or more signals that cause the transducers 52 and 62 to move the movable stages 50 and 60. Preferably, the controller 74 can output signals that independently control the movable stages 50 and 60. The first end mirror 32 can thus be translated a different amount and in a different direction than the second end mirror 34.

In various preferred embodiments, therefore, the controller 74 may include logic to process data from the detector array and may determine characteristics of the beam 25. The process preferably also has logic to create suitable output for driving and/or controlling the translation stages 50, 60 based on the signal input from the profilometer 72.

The controller 74 may also include logic for driving or controlling other components. For example, bending magnets in the electron beam guidance system may be used to control the trajectory of the electron beam 14 to ensure that the electron beam 14 intersects the optical path 25 at the beam waist 40. Optionally, the controller 74 can be programmed to adjust the trajectory of the electron beam 14 via the bending magnets to provide added control over the electron beam 14 within the optical cavity 12. Additional processing may also be implemented on data received by the detector array. In some embodiments, for example, the beam profile at the beam waist 40 or elsewhere may be displayed. Similarly, characteristics of the beam 25 may be determined and output by the system 10.

It will be appreciated that various processes and methods described herein illustrate the structure of the logic which may be embodied in computer program software. Moreover, description included herein may illustrate the structures of logic elements, such as computer program code elements or electronic logic circuits. Likewise, various embodiments include a machine component that renders the logic elements in a form that instructs a digital processing apparatus (e.g., a computer, controller, processor, laptop, workstation, palm top, personal digital assistant, cellphone, etc.) to perform a sequence of method steps corresponding to those described herein. The logic may be embodied by a computer program that is executed by the controller 74 as a series of computer- or control element-executable instructions. These instructions may reside, for example, in RAM or on a hard drive or optical drive, or the instructions may be stored on magnetic tape, electronic read-only memory, or other appropriate data storage device that can be dynamically changed or updated. Some or all the processing can be performed all on the same device, on one or more other devices that communicates with the device, or various other combinations. The controller may also be incorporated in a network and portions of the process may be performed by separate devices in the network. Display of information, e.g., a user interface, can be included on the instrument or on a separate device.

In various preferred embodiments, by adjusting the positions of the first and second movable stages 50 and 60, the controller 74 can change the length of the optical path 25 and tune the cavity 12 and can also modify the focal spot at the beam waist 40. The length of the optical path 25 can be altered by increasing or decreasing the distance between the first and second end mirrors 32, 34. Such adjustments advantageously tune the optical cavity 12 so that the optical pulses input into the cavity are superimposed on optical pulses traveling within the cavity. Adjustments to the optical path length between the first and second end mirrors 32, 34 also tune the resonant frequencies and may provide for coherent superposition of the pulses and mode locking to the pump laser 42. To achieve mode-locking, the controller 74 preferably adjusts the length of the optical path 25 to within a tolerance that is less than the wavelength of the light emitted by the pump laser 42. Coherent superposition of the optical pulses is further discussed below (see FIGS. 3 and 4).

By changing the distance between the second end mirror 34 and the folding mirror 36, the controller 74 can alter characteristics of the beam waist 40, such as the position, intensity, and transverse radius at the beam waist. The controller 74 preferably can be programmed to adjust the movable stage 60 so that the maximum fluence of optical energy in the optical beam 25 is focused onto the particles in the interaction region at the beam waist 40. Accordingly, based on data obtained by the profilometer 72, the second movable stage 60 may be shifted in position to obtain reduced size and increased intensity and to position the beam waist 40 to provide increased interaction with the particle beam 14.

Preferably, the controller 74 can independently adjust the position of each of the first and second movable stages 50 and 60. In response to data received from the profilometer 72, the controller 74 preferably can independently translate the first and second movable stages 50 and 60 so as to independently optimize the coherent superposition of the optical pulses within the optical cavity 12 as well as the properties of the beam, e.g., at the beam waist 40. Since the optical beam 25 is substantially collimated in the region near the first end mirror 32, the position of the first movable stage 50 can be shifted to tune the cavity and provide pulse stacking and mode locking without substantially affecting the shape of the beam between the folding mirror 36 and the second end mirror 34. Accordingly, longitudinal movement of the first end mirror 32 preferably does not affect the focal spot at the beam waist 40.

Preferably, the profilometer 72, controller 74, and control lines 76 to the first and second movable stages 50 and 60 provide a feedback system for adjustment of the optical cavity 12. The 2-D profilometer 72 preferably monitors the characteristics of the optical beam 25 and the controller 74 dynamically adjusts the focal spot and pulse stacking within the optical cavity 12.

In order to achieve efficient pulse stacking and a narrow beam waist 40 in the optical cavity 12, the separation and position of the end mirrors 32, 34 preferably are specified to within a tolerance of several microns. Current engineering methods for polishing and figuring mirrors are largely unable to achieve such tolerances on a reliable basis. The design of the optical cavity 12 circumvents these engineering difficulties, because the storage cavity 12 can be adjusted by translating the first and second end mirrors 32, 34 using the respective first and second translation stages 50, 60 to obtain the suitable mirror separation. Moreover, the controller 74 can independently adjust the length of the optical path 25 without significantly affecting the characteristics of the beam waist 40.

Figure 2:
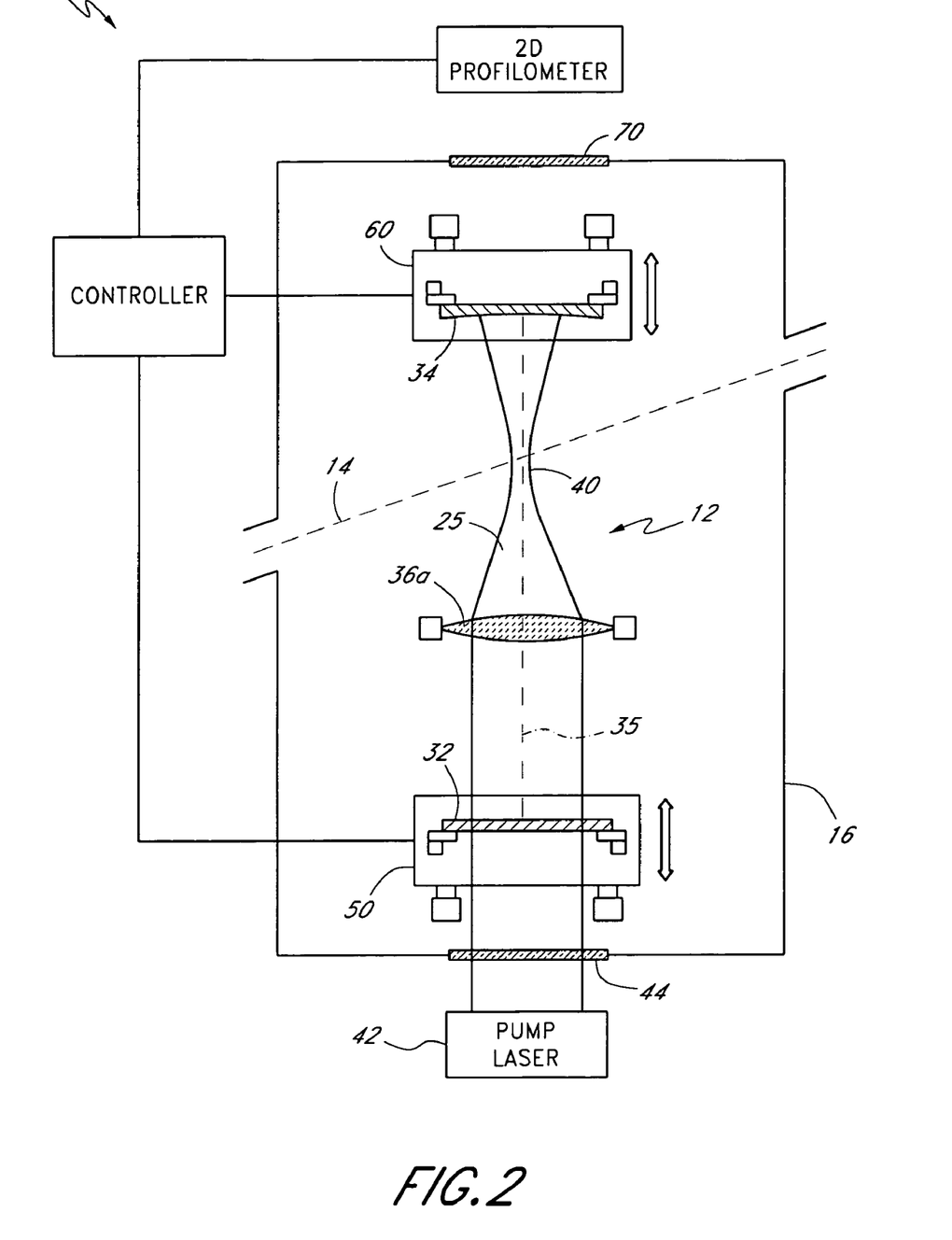
FIG. 2 is a schematic view of an embodiment of the optical storage cavity comprising a plane mirror, a lens, and a spherical mirror.

An alternative embodiment of the system 10 for interacting high intensity pulses with particles is illustrated in FIG. 2. FIG. 2 shows the first end mirror 32 and the second end mirror 34 forming the optical cavity 12. As described above, the optical beam 25 propagates along the optical path 30 in the optical cavity 12. A transmissive optical element 36a, such as a lens, is disposed in the optical path 30 between the two end mirrors 32 and 34 in place of the folding mirror 36. In the embodiment shown in FIG. 2, the optical path 30 is substantially linear although in other embodiments the optical cavity 12 may be bent, for example, by inclusion of one or more folding mirrors. In the embodiment shown in FIG. 2, the transmissive optical element 36 comprises a converging lens having positive power, which preferably comprises material substantially transmissive to the optical beam 25. This lens 36a may comprise, for example, glass or fused silica in some embodiments.

Optical energy is introduced into the optical cavity 12 by the pulsed pump laser 42. The optical beam 25 is substantially collimated between the first end mirror 32 and the lens 36a. In the embodiment depicted in FIG. 2, the first end mirror 32 comprises a substantially planar surface that supports propagation of plane waves. The positive lens 36a focuses the beam 25 thereby providing the beam waist 40 between the positive lens and the second end mirror 34, which comprises a spherical mirror in the embodiment shown in FIG. 2. Accordingly, the optical beam 30 forms a focal spot at the beam waist 40 disposed between the second end mirror 34a and the lens 36a where the light is more concentrated. As discussed above in connection with the embodiment shown in FIG. 1, adjustment of the distance between the two end mirrors 32 and 34 alters the length of the optical path 30 whereas adjustment of the distance between the second end mirror 34 and the positive lens 36 alters the focal spot at the beam waist 40. These adjustments are preferably made by attaching the end mirrors 32 and 34 to the first and second independently movable stages 50 and 60, respectively. In FIG. 2, the lens 36s is depicted as a biconvex converging lens, however different lens shapes, such as for example, plano-convex, may be employed in other embodiments. Lenses having power or focusing properties with elliptical, cylindrical, or rectangular symmetry may also be used. Furthermore, certain embodiments of the system 10 may utilize more than one lens to form the focal spot at the beam waist 40.

To reduce the absorptive loss, however, absorbing optical elements are preferably not included in the laser cavity 12. Accordingly, in various embodiments, the optical element 36 preferably comprises a mirror or other reflective optical element such as shown in FIG. 1.

The positions, orientations, and shapes of the mirrors and lenses depicted in FIGS. 1 and 2 are exemplary and are not intended to be limiting. Other embodiments can be constructed using different optical elements and different configurations. For example, different types of optical elements such as holographic or diffractive optical elements or other types of optics may be employed in place of the first or second end mirrors 32, 34 and/or the folding mirror 36 or transmissive optical element 36a disposed therebetween. Other types of optical elements are also possible. Preferably, however, reflective optics are used to reduce absorptive loss. Additionally, the optics together preferably provides an optical cavity that can coherently stack optical pulses and focus the optical energy into the localized region corresponding, for example, to the interaction region 15 with the particle beam 14.

Other variations are possible, for example, although the first end mirror 32 and the second end mirror 34 are shown as movable in other embodiments various combinations of the first and second end mirrors and the optical element 36 therebetween such as the lens 36a may be mounted on translation stages and may be moveable. For example, in certain embodiments, the first end mirror 32 and the lens 36a may be translated by translation stages or the second end mirror 34 and the lens 36a may be mounted on translation stages. In some embodiment the first and second mirrors 32, 34 as well as the lens 36a may be shifted along the longitudinal direction to adjust the optical cavity. Similarly, the controller 74 may be employed to adjust the positions of the first end mirror and the lens 36a or the second end mirror 34 and the lens, or the first and second mirrors and the lens 36a. Movement of the optical element, however, will alter beam waist preferably without altering the optical path and thus without detuning the cavity frequency.

In other embodiments, additional lenses may be included in the optical cavity 12. The shape of the first and second end mirrors 32, 34 may likewise be different. For example, the first end mirror 32 may be other than planar with the combination of the first end mirror and one or more additional lenses providing a collimated beam in a portion of the optical cavity 12. Additionally, in some embodiments, one or more of these lenses may be translated instead of the first and/or second end mirrors 32, 34. As described above, however, lenses may introduce absorption and in various preferred embodiments optical loss is preferably reduced.

Figures 3, 4, 5:
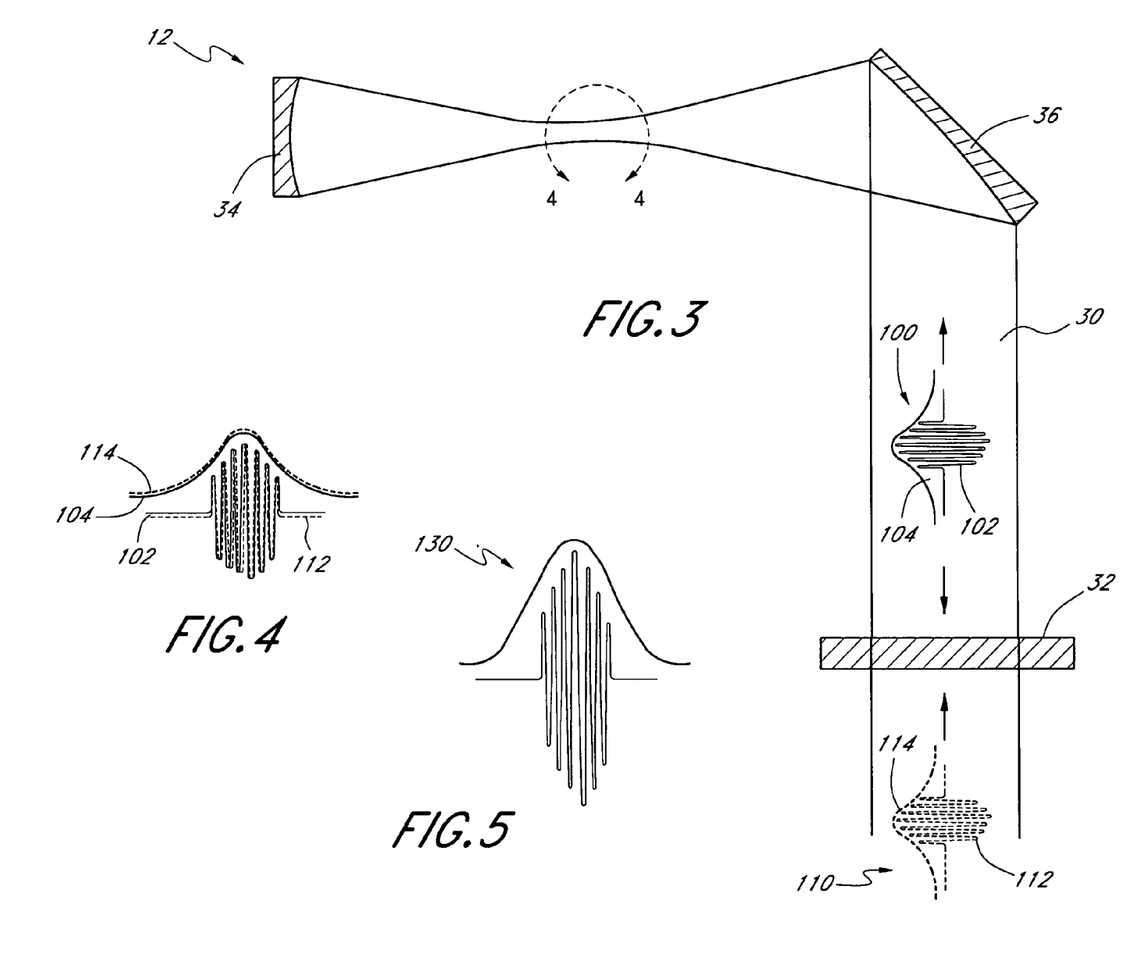
FIG. 3 schematically illustrates an embodiment of the optical storage cavity wherein pulse stacking is achieved by adjusting the distance between the plane mirror and the spherical mirror.
FIG. 4 schematically illustrates the coherent superposition and stacking of optical pulses in the optical storage cavity shown in FIG. 3.
FIG. 5 schematically illustrates the coherent sum of stacked optical pulses.

FIG. 3 illustrates pulse stacking in one embodiment of the optical cavity 12. The optical path 30 between the first and second end mirrors 32 and 34 has a path length L. The round-trip light travel time T in the optical cavity 12 is therefore $T=2L/v$, where v is the speed of the light pulses in the Gaussian mode of the cavity. The free spectral range (FSR) of the optical cavity 12 is the inverse of this round-trip travel time in the cavity. The length of the optical cavity 12, and accordingly the round-trip light travel time (and FSR), can be changed by translating either of the first or second movable stages 50 or 60 in response to signals from the controller 74.

In order for the system 10 to form high intensity optical pulses, preferably the optical pulse injected into the optical cavity 12 by the pump laser 42 is superimposed on an optical pulse in the optical cavity 12 that is reflected between the first and second end mirrors 32, 34. The pump laser 42 emits laser pulses at a repetition rate $f_{rep}$. These laser pulses are also characterized by an average optical frequency, v. Superposition of the optical pulses can be achieved by tuning the optical cavity 12 so that the ratio of the round-trip light travel time T to the time between pump laser pulse emissions $f_{rep}^{-1}$ is a rational number. The controller 74, by translating either of the first or second movable stages 50, 60, can adjust the length of the optical cavity 12 such that $mT=nf_{rep}^{-1}$ where m and n are an integers. In certain preferred embodiments, $T=f_{rep}^{-1}$ or equivalently, the FSR of the optical cavity 12 is equal to the pump laser 42 repetition rate. In other preferred embodiments, $T=f_{rep}^{-1}$, where n is substantially an integer.

FIG. 3 illustrates the coherent superposition of two pulses in the optical cavity 12. A first laser pulse 100 is shown propagating in the optical cavity 12 toward the first end mirror 32. A second laser pulse 110 emitted from the laser pump (not shown) is shown propagating away from the laser pump and toward the optical cavity 12 and in particular toward the first end mirror 32. The first laser pulse 100 is defined by an oscillatory electric field 102 having an envelope 104. The second laser pulse 110 is also defined by an oscillatory electric field 112 having an envelope 114. The widths of the first and second laser pulses 100 and 110 are characterized by the full-width half-maximum (FWHM) values of the envelopes 104 and 114, respectively. Preferably, the laser pulse widths are much shorter than the time between emissions of the individual pulses, $f_{rep}^{-1}$. To increase the optical energy in the first optical pulse 100, the second optical pulse 110 will preferably overlap substantially, in both the transverse and parallel directions with respect to the beam, as the second optical pulse 110 enters the optical cavity 12. The first optical pulse 100 will be reflected from the first end mirror 32 toward the folding mirror 36 while the second optical pulse 110 propagates through the first end mirror into the optical cavity 12. Superposition of the envelopes 104, 114 (i.e. mode locking) enhances the intensity of the optical pulse propagating in the optical resonator 12. Moreover, the electric fields 102, 112 also are in phase such that coherent superposition is achieved as illustrated in FIG. 4. Preferably the timing of the pump laser pulses (e.g., pulse 110) coincides with the propagation of the pulses (e.g., pulse 100) within the optical resonator 12 such that the electromagnetic fields of the respective pulses substantially overlap so as to produce an additive effect. If the phase and frequency of the electric fields 102, 112 are matched, coherent superposition will result. In this manner, energy in successive pump laser pulses will be added coherently to the optical energy stored within the optical cavity 12 so as to produce a pulse 130 that is the coherent sum (see FIG. 5). The optical resonator 12 is thereby mode locked to the optical pump 42.

By locking the optical cavity 12 to the pump laser 42 as discussed above, the laser pulses 100 and 110 will be coherently summed together and with other pulses injected into the optical cavity 12 by the pump laser 42. Preferably, the resultant high intensity pulses are also focused at the beam waist 40.

To produce such coherent superpositioning (phase coincidence) and mode locking (envelope coincidence), the profilometer 72 may monitor the intensity of the optical beam 25, for example, at the beam waist 40. The controller 74 may adjust the first end mirror 32 to tune the cavity 12 to provide for coherent superposition, which may yield increased intensity. The controller 74 may drive the first translation stage 50 supporting the first end mirror 32 to also tune the cavity length to the appropriate operating frequency that corresponds to a suitable frequency of the pump laser. In certain embodiments, the controller 74 may adjust the optical phase of the incident optical pulses. Accordingly, the resonant frequencies of the optical cavity 12 are matched to the optical frequencies of the laser pulse trains 100, 110.

In various preferred embodiments, the second end mirror 34 is also adjusted to position the beam waist 40 appropriately, for example, to suitably overlap the particle beam 14. In certain embodiments, the second end mirror 34 is translated to adjust the size and location of the beam waist 40 with subsequent adjustments of the first end mirror 32 to tune the optical path length and resonant frequency of the optical cavity 12. Advantageously, the first end mirror 32 may be shifted generally without disturbing the location of the beam waist 40. In various preferred embodiments, the profilometer 72 provides repetitive feedback to the controller 74 regarding the tuning of the cavity 12 and the size and position of the beam waist 40 such that the controller can in virtually real time adjust the first and second translation stages 50, 60 and corresponding end mirrors 32, 34. Multiple readjustments may enable the proper tuning of the resonator cavity 12 during changing environmental effects such as vibration and temperature fluctuation.

Figure 6:
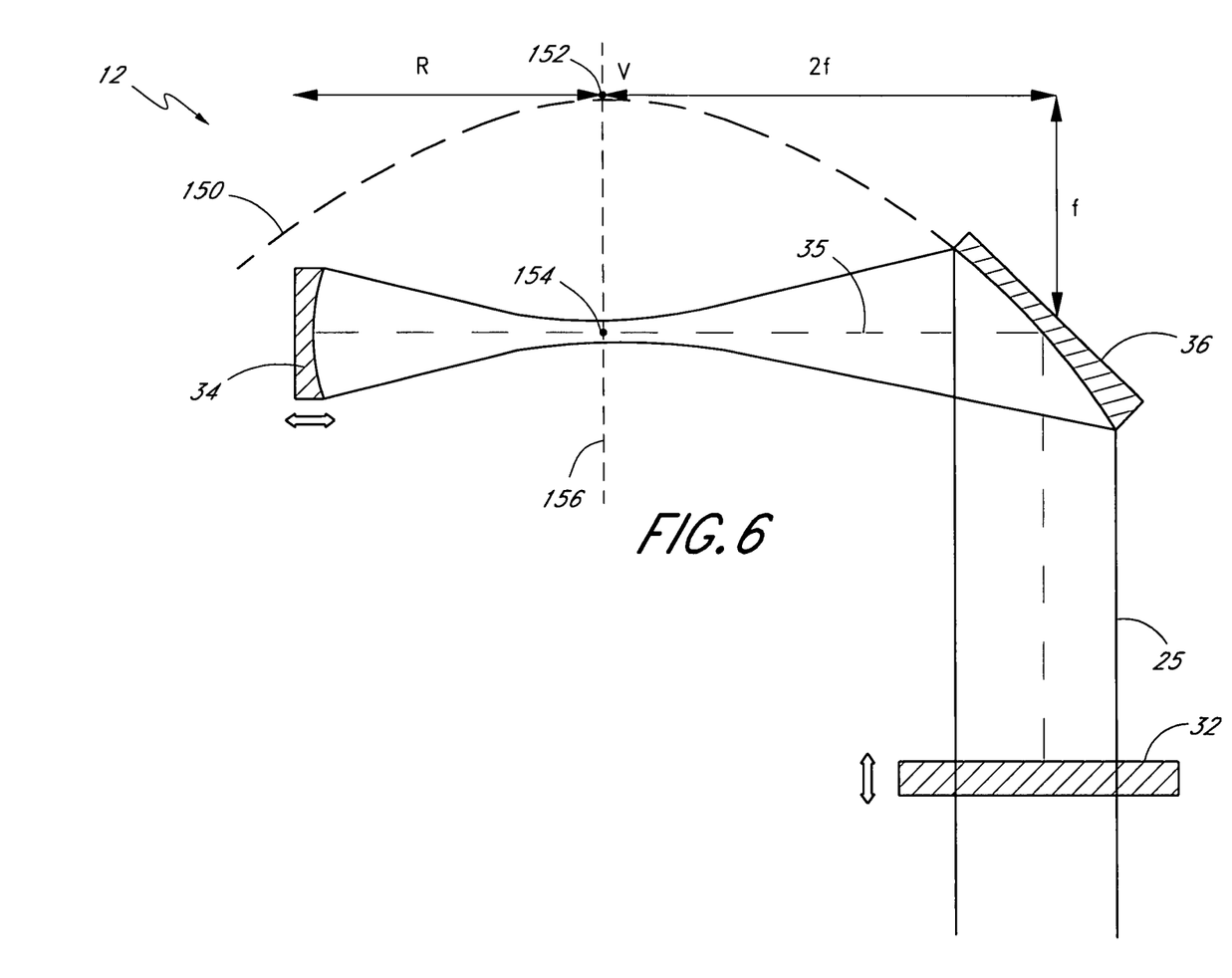
FIG. 6 schematically illustrates the geometry of the off-axis paraboloidal mirror shown in FIG. 1.

FIG. 6 shows the shape, orientation, and positions of the optical elements in the embodiment of the optical cavity 12 shown in FIG. 1. The first end mirror 32 is substantially planar. The second end mirror 34 is spherical and has a radius of curvature denoted by R. The folding mirror 36 is disposed between the first and second end mirrors 32, 34 and folds the optical beam 25 from the first section of the optical cavity 12 between the first end mirror 32 and the folding mirror 36 into the second section of the optical cavity between the folding mirror 36 and the second end mirror 34. As described above, in various preferred embodiments, the beam 25 is substantially collimated in the first section of the optical cavity 12 and converges into a narrow beam waist 40 in the second section of the optical cavity. Accordingly, the folding mirror 36 preferably converts substantially collimated wavefronts into converging wavefronts thereby matching the collimated portion of the beam with the converging portion of the beam.

In one preferred embodiment, the folding mirror 36 preferably comprises an off-axis parabolic mirror. The shape of the surface of the folding mirror 36 substantially conforms to a portion of a paraboloid. The paraboloid is generated by rotating a parabola 150 shown in FIG. 6 having a vertex, V, 152 and a focus, F, 154 about a central axis 156 that passes through the vertex 152 and the focus 154. The distance between the vertex 152 and the focus 154 is denoted by f. The parabola 150 is also defined by a directrix (not shown) perpendicular to the central axis and displaced along the central axis 156 a distance, f, from the vertex 152. A line segment know as the latus rectum of the parabola 150 extends perpendicular to the central axis 156 (parallel to the directrix) and through the focus 154, with endpoints on the parabola 150. In FIG. 6 where the optical beam 25 is folded by about 90°, the latus rectum coincides with the portion of the optical axis 35 through the second section of the optical cavity 12.

To fold the optical beam 25 at an angle of about 90° in the embodiment illustrated in FIG. 6, the center of the folding mirror 36 is offset perpendicularly from the central axis 156 along the latus rectum. Correspondingly, the optical path 25 preferably is also shifted from the central axis 156 of the parabola 150. Therefore, the shape of the surface of the folding mirror 36 preferably is an off-axis paraboloid (referred to as an off-axis parabolic mirror) and does not extend through the central axis 156 of the parabola 150. Alternatively, the folding mirror 36 is parabolic and extends through the central axis 156 of the parabola although in some embodiments the parabolic mirror is asymmetric, being shifted to one side of the parabola. In some embodiments, an on-axis parabolic mirror that is symmetric about the central parabolic axis 156 of the parabola 150 may be employed. Preferably, however, the portion of the parabolic mirror 36 illuminated by the optical beam 25 is shifted with respect to the central axis 156 of the parabola even in cases where the mirror extends through the central axis 156 of the parabola. In the embodiment shown in FIG. 6, the center of the folding mirror 36 is located on the paraboloid 150 a horizontal distance $2f$ from the central axis 156 (i.e., at one end of the latus rectum). Other embodiments of the optical cavity 12, however, may utilize off-axis paraboloidal mirrors 36 corresponding to different portions of the parabola and that are off-set different distances from the central axis 156.

In the region near the first end mirror 32, the optical beam 25 preferably is substantially collimated. Likewise, movement of the first end mirror 32 does not affect the shape of the optical beam 25 in the second section of the optical cavity between the folding mirror 36 and the second end mirror 34. As shown in FIG. 6, the optical beam 25 is incident on the folding mirror 36 at an oblique angle such as 45°. The folding mirror 36 causes the optical path 25 to fold into the second section of the optical cavity 12. The second end mirror 34 is preferably disposed with respect to the folding mirror 36 to reflect the optical beam 25 back toward the folding mirror. The curvature of the second end mirror 34 and the curved folding mirror 36 preferably support propagation of a symmetric or asymmetric Gaussian beam that narrows in the region near the focus 154 where the transverse radius of the optical beam 25 is reduced.

Various properties of the beam waist 40 depend on the curvatures of the second end mirror 34 and the folding mirror 36 and the distances therebetween. The optical storage cavity 12 depicted in FIG. 6 is a near-concentric resonant optical cavity 12 wherein the centers of curvature of the spherical end mirror 34 and the parabolic folding mirror 36 substantially coincide. In various preferred embodiments, the optical resonator 12 comprises a near concentric cavity with the centers of curvature of the second end mirror 34 and the curved folding mirror 154 being substantially close, e.g., separated by several microns or tens of microns (e.g., between about 2 and 50 microns), depending on the particular design. Other separations between the centers of curvature are possible. The focus of the second end mirror 34 and the focus of the curved folding mirror 36 may be displaced an amount that provides the desired size and location of the beam waist 40. In some embodiments, the parabolic shaped mirror and the spherical mirror may have respective foci separated by between several microns or tens of microns (e.g., about $10^{-2}$ centimeters or less) in designs where the cavity lengths are up to about one meter and mirror diameters are about one inch. Other values outside these ranges are possible. As described above, the second end mirror 34 may be translated to re-position the beam waist 40 to provide suitable interaction with the particle beam 14. Preferably, however, the optical cavity 12 is stable and the separation between the respective centers of curvature is not so large that optical losses, for example, resulting from diffraction, are significant. As described above, the optical storage cavity 12 is preferably not diffractively lossy. The size, radius of curvature, and separation of the second end mirror 34 and the curved folding mirror 36 are such that any diffractive losses are substantially less than the transmissive cavity losses.

In the embodiment illustrated in FIG. 6, the folding mirror 36 and the second end mirror 34 are positioned on the latus rectum of the parabola 150. Also, the optical beam 25 is deflected by an angle of 90° as measured for example at the optical axis 35 through the optical cavity 12 which tracks the optical path 30 of the beam. The optical storage cavity 12, however, need not be limited to fold angles of 90°, as other angles are possible.

Figure 7:
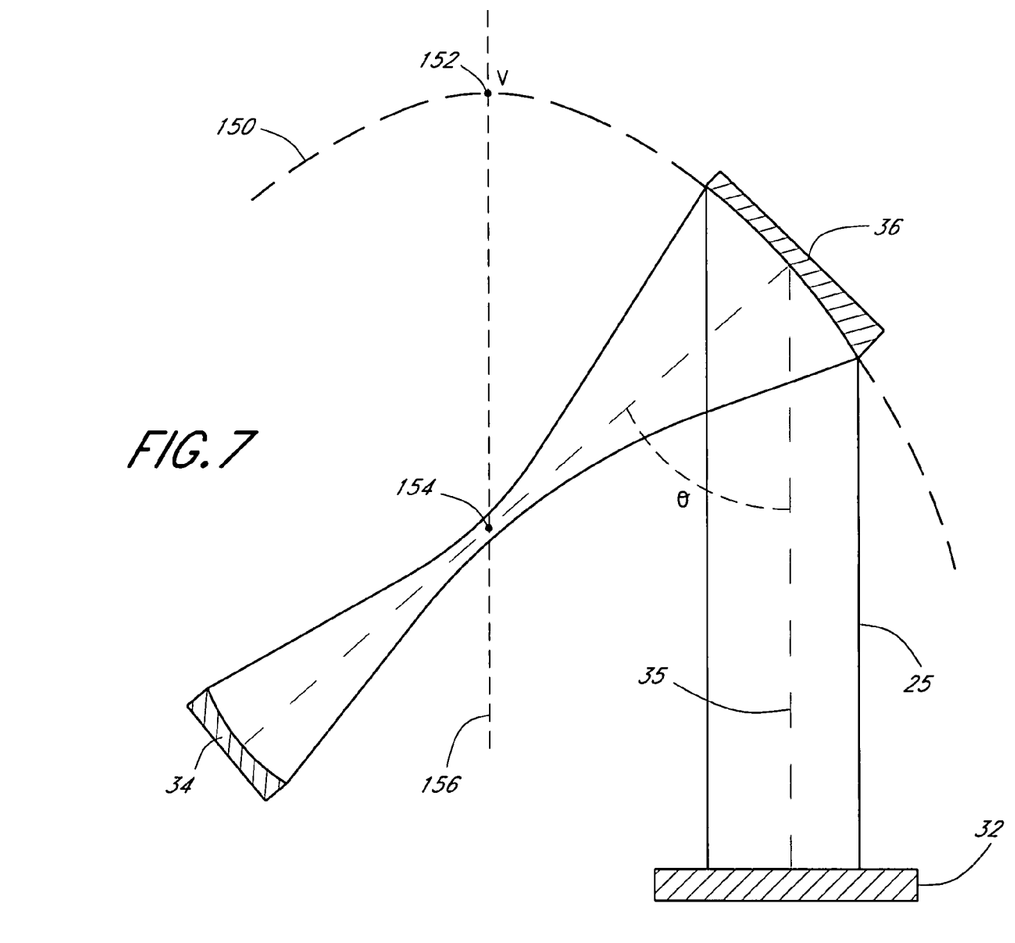
FIG. 7 depicts an alternative configuration of the optical cavity.

FIG. 7, for example, depicts a configuration wherein the optical cavity 12 has a fold angle, θ, different than 90°. The fold mirror 36 is positioned on the parabola 150 closer to from the central axis 156 of the parabola than the embodiment shown in FIG. 6. Likewise, the fold angle, θ, is less than 90°. In such an embodiment, the second end mirror 34 preferably would be positioned farther from the vertex 152 than depicted in FIG. 6 in order to be positioned along the portion of the optical path 30 from the folding mirror 36 and through the focus 154.

Other embodiments of the optical cavity 12 may utilize different folding angles to accommodate, for example, alternate orientations between the optical beam 25 and the electron beam 14. In other embodiments, the folding mirror 36 is positioned on the paraboloid farther away from the central axis 156 than depicted in FIG. 6 and the optical beam 25 will fold at an angle greater than ninety degrees. In such an embodiment, the second end mirror 34 preferably would be positioned closer to the vertex 152 than depicted in FIG. 6 in order to be positioned along the portion of the optical path 30 from the folding mirror 36 and through the focus 154.

Other variations are possible. The shape of the optical elements such as the first and second end mirrors 32, 34 as well as the folding mirror 36 or other optical element between the first and second end mirrors may be different. For example, the shape of the folding mirror 36 or other optical element may correspond to a parabola having different curvature. Alternatively, non-parabolic shapes may be employed. In some embodiments, the optical element 36, 36a matching the collimated portion of the beam 25 to the non-collimated portion of the beam may have properties aside from shape that contribute to the waveshaping. For example, the optical element 36, 36a may comprise a gradient index lens or a holographic or diffractive optical element. The refractive, diffractive, or other properties of such elements, however, may be configured to match the collimated wavefronts with the non-collimated (converging or diverging) wavefronts. In addition, although a single folding mirror 36 is shown in various embodiments described herein such as in connection with FIG. 1, in certain embodiments, more than one waveshaping element may be introduced into the cavity 12 to transform the substantially collimated beam into a beam having a focus or beam waist 40.

Other configurations are possible. In certain embodiments, for example, instead of a translation stage, a device that varies the optical path such as by varying the index of refraction could be used to tune the cavity. Adaptive optics could also be employed to tune the cavity to adjust the location of the beam waist. Still other embodiments are possible.

As described above, optical storage cavity 12 configurations disclosed herein may be useful for interacting optical energy with particles such as atoms, molecules, as well as subatomic particles such as electrons, positrons, protons, neutrons, or antiprotons. The optical energy can also be interacted with photons in another optical beam or with vacuum. In certain embodiments, the interaction of high intensity optical pulses with an electron beam yields X-rays or gamma rays as a result of Compton backscattering. The particular application, however, should not be limited as the optical storage cavity 12 may be otherwise employed.

Moreover, although described above in connection with particular embodiments of the present invention, it should be understood that the descriptions of the embodiments are illustrative of the invention and are not intended to be limiting. Various modifications and applications may occur to those skilled in the art without departing from the true spirit and scope of the invention as defined in the appended claims.

What is claimed is:

1. An apparatus comprising:
an optical cavity comprising first and second mirrors, said first mirror being substantially planar, said cavity providing an optical path between the mirrors;
a source of optical pulses coupled to introduce optical energy into said cavity along said optical path;
an optical element disposed in said optical path such that a beam waist of the optical energy is disposed between the optical element and the second mirror;
a first transducer which adjusts the distance between said second mirror and said optical element to change a characteristic of said waist, said change in said waist changing the length of the optical path; and
a second transducer which adjusts the distance between said first planar mirror and said second mirror to change the optical path length,
wherein said optical cavity is arranged such that the change in path length due to the second transducer does not significantly affect said characteristic of the waist.

2. The apparatus of claim 1, wherein said optical element comprises a folding mirror.

3. The apparatus of claim 2, wherein said folding mirror comprises a parabolic shaped mirror.

4. The apparatus of claim 3, wherein said second mirror comprises a spherical mirror.

5. The apparatus of claim 4, wherein said parabolic shaped mirror and said spherical mirror have respective centers of curvature separated by about $10^{-2}$ centimeters or less, thereby forming a near concentric optical cavity.

6. The apparatus of claim 1, wherein said optical cavity excludes a gain medium, thereby reducing absorption in said cavity.

7. The apparatus of claim 1, wherein said first transducer and said second transducer are selected from the group consisting of a piezoelectric device and a motor.

8. The apparatus of claim 1 wherein said optical cavity is configured such that said pulses interact with vacuum, with other light beams, or with selected particles disposed in the optical path at said waist.

9. The apparatus of claim 8, wherein said source of particles comprises an electron source.

10. The apparatus of claim 1, further comprising an optical detector for sensing said optical energy and spatial mode profile.

11. The apparatus of claim 9, further comprising a feedback system that receives input from said optical detector and adjusts said first and second transducers based on said input from said optical detector.

12. A method comprising:
interacting an optical beam with particles disposed in an optical cavity at substantially a waist of the optical beam, the optical cavity comprising at least first and second optical components;
altering a characteristic of the beam waist by changing the length of the cavity with an adjustment to the second optical component; and
altering the length of the optical cavity without significantly affecting the waist of the beam with an adjustment to the first optical component.

13. The method of claim 12, wherein said interacting said optical beam with particles comprises interacting said beam with electrons.

14. The method of claim 12, wherein said interacting said optical beam with particles comprises interacting said beam with atoms, molecules, positrons, protons, neutrons, or antiprotons, or photons.

15. The method of claim 12, wherein said altering a characteristic of the beam waist comprises altering the size of the beam waist.

16. The method of claim 12, wherein said altering a characteristic of the beam waist comprises altering the location of the beam waist.

17. The method of claim 12, further comprising introducing a plurality of optical pulses into said optical cavity.

18. The method of claim 17, wherein said length of said optical cavity is varied such that at least two of said optical pulses are coherently superimposed.

19. The method of claim 18, further comprising propagating said optical pulses in said optical cavity without introducing gain.

20. An apparatus comprising:
a storage cavity comprising first and second reflective optical elements, said first reflective optical element being substantially planar, said cavity providing a beam path between said first and second reflective optical elements;
a source of electromagnetic pulses coupled to introduce electromagnetic energy into said cavity along said beam path;
a third optical element disposed in said beam path such that a beam waist of the electromagnetic energy is disposed between the second reflective optical element and the third optical element, and such that said pulses interact with selected particles disposed in the beam path at said waist;
a first transducer which adjusts the distance between said second reflective optical element and said third optical element to change a characteristic of said waist, said change in said waist changing the length of the beam path; and
a second transducer which adjusts the distance between said first planar reflective optical element and said second reflective optical element to change the beam path length,
wherein said storage cavity is arranged such that the change in path length due to the second transducer does not significantly affect said characteristic of the waist.

21. The apparatus of claim 20 wherein said optical cavity has between about 0.01% and 1% loss.

22. A method comprising:
interacting an electromagnetic beam with particles disposed in a storage cavity at substantially a waist of said electromagnetic beam, said storage cavity having an optical path length;

altering a characteristic of the beam waist by changing the optical path length of the cavity using a first adjustment to the storage cavity; and altering the optical path length of the storage cavity without significantly affecting the waist of the beam using a second adjustment to the storage cavity.

23. The method of claim 22, wherein no more than about 0.01% to 1% optical loss is introduced by said storage cavity.

24. The apparatus of claim 1, wherein the first and second mirrors are at least partially optically transmissive.

25. The apparatus of claim 20, wherein the first and second reflective optical elements are at least partially optically transmissive.

* * * * *